United States Patent
Nakatani et al.

(10) Patent No.: US 6,877,312 B2
(45) Date of Patent: Apr. 12, 2005

(54) EXHAUST EMISSION CONTROL SYSTEM OF INTERNAL COMBUSTION ENGINE

(75) Inventors: Koichiro Nakatani, Mishima (JP); Shinya Hirota, Susono (JP); Shunsuke Toshioka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/613,100

(22) Filed: Jul. 7, 2003

(65) Prior Publication Data

US 2004/0006977 A1 Jan. 15, 2004

(30) Foreign Application Priority Data

Jul. 12, 2002 (JP) ........................................ 2002-204692

(51) Int. Cl.$^7$ ................................................. F01N 3/00
(52) U.S. Cl. ........................... 60/288; 60/286; 60/295; 60/297; 60/303; 60/324
(58) Field of Search ......................... 60/280, 286, 287, 60/288, 292, 295, 297, 301, 303, 324, 305

(56) References Cited

U.S. PATENT DOCUMENTS 5,085,049 A * 2/1992 Rim et al. ..................... 60/274
5,974,791 A * 11/1999 Hirota et al. .................. 60/276
6,212,885 B1 * 4/2001 Hirota et al. .................. 60/288
6,708,486 B1 * 3/2004 Hirota et al. .................. 60/297

FOREIGN PATENT DOCUMENTS

| JP | 406033735 A | * 2/1994 | ................... 60/287 |
| JP | A 6-159037 | 6/1994 | |
| JP | A 7-119444 | 5/1995 | |
| JP | A 8-061052 | 3/1996 | |
| JP | A 11-062563 | 3/1999 | |
| JP | A 2001-073748 | 3/2001 | |
| JP | 2004028030 A | * 2/2004 | ................... 60/295 |

OTHER PUBLICATIONS

U.S. Appl. No. 10/259,894, filed Sep. 30, 2002, Nakatani et al.
U.S. Appl. No. 10/405,647, filed Apr. 3, 2003, Nakatani et al.

* cited by examiner

Primary Examiner—Binh Q. Tran
(74) Attorney, Agent, or Firm—Oliff & Berridge, PLC (57) ABSTRACT

An exhaust emission control system for an internal combustion engine includes an exhaust passage that branches into a first exhaust branch passage and a second exhaust branch passage, which join at downstream ends thereof into a common exhaust passage, a NOx catalyst disposed in each of the exhaust branch passages, a particulate filter disposed in the common exhaust passage and located downstream of a joining point of the exhaust branch passages, and flow control valves that control the amounts of exhaust gas flowing through the respective exhaust branch passages.

28 Claims, 4 Drawing Sheets

EXHAUST EMISSION CONTROL SYSTEM OF INTERNAL COMBUSTION ENGINE

INCORPORATION BY REFERENCE

The disclosure of Japanese Patent Application No. 2002-204692 filed on Jul. 12, 2002, including the specification, drawings and abstract, is incorporated herein by reference in its entirety.

BACKGROUND OF THE INVENTION

1. Field of the Invention

The invention relates to an exhaust emission control system of an internal combustion engine.

2. Description of Related Art

Various types of exhaust emission control systems for purifying exhaust gas emitted from combustion chambers of internal combustion engines are known in the art. For example, Japanese Laid-open Patent Publication No. 6-159037 discloses an exhaust emission control system that includes a particulate filter for trapping particulates contained in exhaust gas and burning and removing the trapped particulates. The particulate filter carries a NOx absorbent that is useful for promoting combustion of the particulates trapped in the filter. In operation, the NOx absorbent supported by the particulate filter absorbs nitrogen oxides (NOx) contained in the exhaust gas when an oxidizing atmosphere exists around the particulate filter, and releases the absorbed NOx when a reducing atmosphere exists around the filter so that the NOx is reduced and removed by a reductant contained in the reducing atmosphere.

When the NOx is reduced and removed by the reductant, reaction heat is generated, and the temperature of the particulate filter is raised due to the reaction heat. Generally, particulates trapped in the particulate filter are more likely to be ignited as the temperature of the particulate filter increases. Namely, in the exhaust emission control system disclosed in the above-identified publication, the NOx absorbent serves to promote combustion of the particulates trapped in the particulate filter. Thus, the conventional exhaust emission control system is provided with various measures or means for improving its emission purification efficiency.

SUMMARY OF THE INVENTION

In the meantime, the exhaust emission control system has been required to remove or convert undesirable components of as many kinds as possible contained in exhaust gas at a high removal efficiency or conversion rate. It is therefore an object of the invention to provide an exhaust emission control system that is capable of removing, at a high efficiency, undesirable or harmful components of as many kinds as possible which are contained in exhaust gas emitted from combustion chambers of an internal combustion engine.

To accomplish the above and/or other object(s), there is provided according to the invention an exhaust emission control system for purifying exhaust gas emitted from at least one combustion chamber of an internal combustion engine, comprising: (a) an exhaust passage that comprises a first exhaust branch passage and a second exhaust branch passage, which join at downstream ends thereof into a common exhaust passage, (b) a first NOx catalyst disposed in the first exhaust branch passage, (c) a second NOx catalyst disposed in the second exhaust branch passage, (d) a particulate filter disposed in the common exhaust passage and located downstream of a joining point of the first exhaust branch passage and the second exhaust branch passage, (e) a first flow control valve that controls an amount of exhaust gas flowing through the first exhaust branch passage, and (f) a second flow control valve that controls an amount of exhaust gas flowing through the second exhaust branch passage. In this exhaust emission control system, each of the first and second NOx catalysts stores NOx contained in the exhaust gas when an air/fuel ratio of the exhaust gas flowing into the NOx catalyst is lean, and allows a reducing agent to reduce and remove the stored NOx when the air/fuel ratio of the exhaust gas flowing into the NOx catalyst is rich, and the particulate filter traps particulates contained in the exhaust gas, and oxidizes and removes the trapped particulates.

In the exhaust emission control system constructed as described above, nitrogen oxides (NOx), carbon monoxide (CO), unburned hydrocarbons (HC), particulates, and the like, contained in exhaust gas emitted from the combustion chambers of the internal combustion engine are removed at the same time at a high removal efficiency.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

Figure 1:
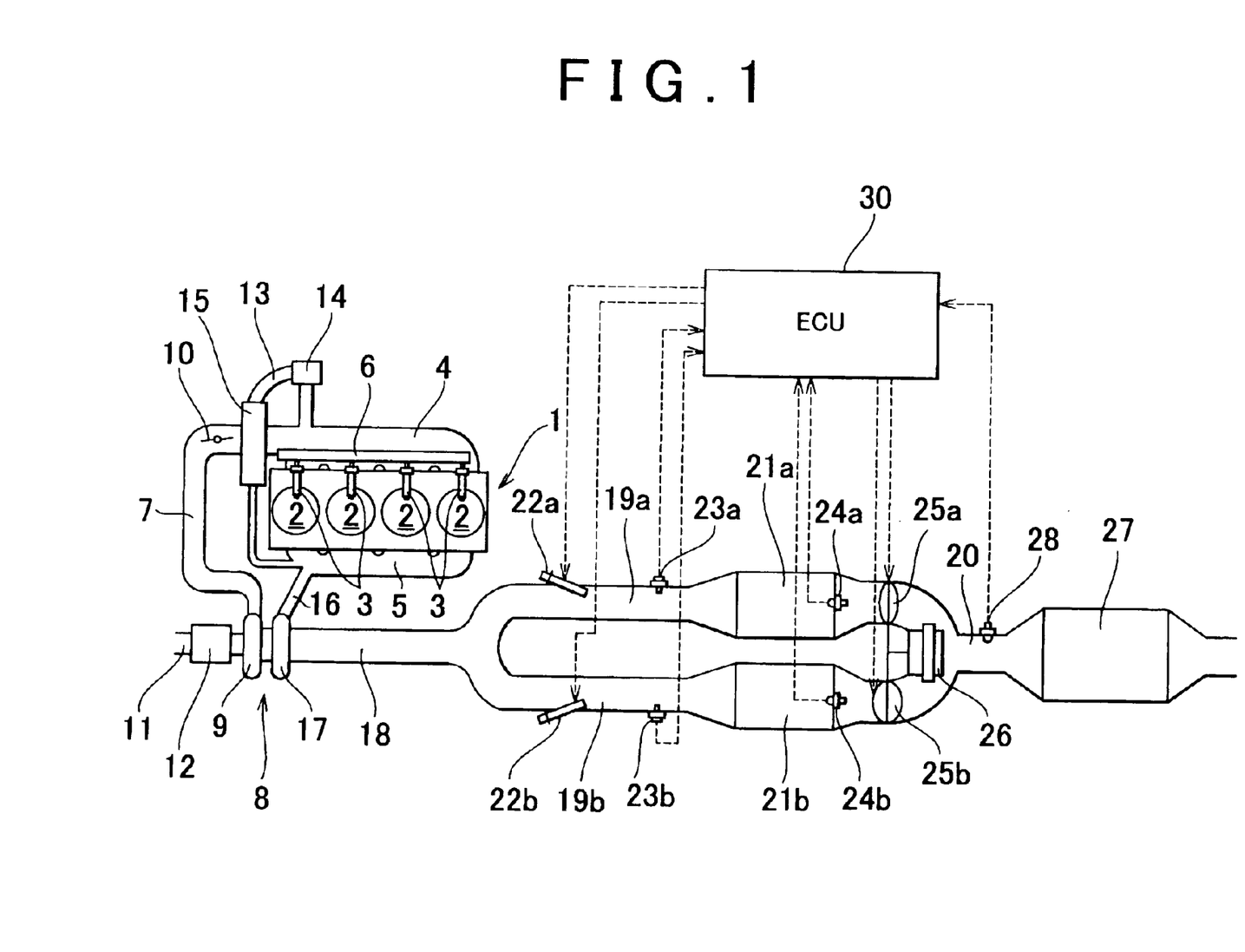
FIG. 1 is a view showing the whole construction of an internal combustion engine equipped with an exhaust emission control system according to one embodiment of the invention.

An exemplary embodiment of the invention will be described with reference to the drawings. FIG. 1 shows the whole construction of an internal combustion engine equipped with an exhaust emission control system constructed according to one embodiment of the invention. The internal combustion engine of FIG. 1 is a compression ignition type internal combustion engine. The engine shown in FIG. 1 includes an engine body 1, combustion chambers 2, fuel injectors 3, an intake manifold 4 and an exhaust manifold 5. The fuel injectors 3 are connected to a common reservoir (i.e., a common rail) 6 that temporarily stores fuel for use in the engine. The intake manifold 4 is connected to an outlet of a compressor 9 of an exhaust turbocharger 8 via an intake pipe 7. A throttle valve 10 that serves to control the quantity of air drawn into the combustion chambers 2 is disposed in the intake pipe 7. Another intake pipe 11 is connected to an inlet of the compressor 9. An air flow meter 12 for measuring the quantity of air drawn into the combustion chambers 2 is attached to the intake pipe 11.

The exhaust manifold 5 and the intake manifold 4 are connected to each other through an exhaust gas recirculation (EGR) passage 13 that allows exhaust gas discharged from the combustion chambers 2 to be introduced again into the combustion chambers 2. An EGR control valve 14 adapted to control the quantity of exhaust gas to be introduced into the combustion chambers 2 is disposed in the EGR passage 13. Also, an intercooler 15 for cooling the exhaust gas passing through the EGR passage 13 is mounted in the EGR passage 13 upstream of the EGR control valve 14.

The exhaust manifold 5 is connected to an inlet of a turbine 17 of the exhaust turbocharger 8 via an exhaust pipe 16. Another exhaust pipe 18 is connected to an outlet of the turbine 17. The exhaust pipe 18 branches or diverges at a downstream side into a first exhaust branch pipe 19a and a second exhaust branch pipe 19b. The exhaust branch pipes 19a, 19b merge or join at a further downstream side into a common exhaust pipe 20.

A first NOx catalyst 21a for removing nitrogen oxides (NOx) contained in the exhaust gas is disposed in the first exhaust branch pipe 19a. The NOx catalyst 21a serves to store NOx by absorbing or adsorbing NOx in the exhaust gas when an oxidizing atmosphere is present in the NOx catalyst 21a. Thus, the NOx catalyst 21a has a NOx storage function. If the catalyst temperature becomes higher than a NOx reduction temperature, and the atmosphere inside the NOx catalyst 21a turns into a reducing atmosphere, the NOx catalyst 21a releases the stored NOx, which is then reduced and removed by a reductant in the reducing atmosphere. Thus, the NOx catalyst 21a has a NOx reduction function. The NOx catalyst 21a also functions as a three way catalyst. When an oxidizing atmosphere is present in the NOx catalyst 21a, therefore, the catalyst 21a oxidizes and removes carbon monoxide (CO) and unburned hydrocarbons (HC) contained in the exhaust gas.

A first fuel addition device 22a for injecting fuel to be added to the exhaust gas is attached to a portion of the first exhaust branch pipe 19a located upstream of the first NOx catalyst 21a. The fuel addition device 22a is mainly used for supplying fuel to the first NOx catalyst 21a, or supplying fuel to a particulate filter that will be described later. A rich-gas supply device capable of delivering exhaust gas having a rich air/fuel ratio may be employed in place of the fuel addition device.

In addition, a first air/fuel ratio sensor 23a for detecting the air/fuel ratio of the exhaust gas is attached to the first exhaust branch pipe 19a between the first fuel addition device 22a and the first NOx catalyst 21a. The first air/fuel sensor 23a is mainly used for controlling the air/fuel ratio of the exhaust gas delivered from the first NOx catalyst 21a to a target air/fuel ratio. The air/fuel ratio of the exhaust gas mentioned herein means the ratio of air to fuel that is calculated according to an expression that $Ga1/(Q \times Ga1/Ga+Q1)$ where Q is the quantity of fuel injected from the fuel injectors 3 into the combustion chambers 2, Q1 is the quantity of fuel injected from the first fuel addition device 22a, Ga is the quantity of air drawn into the combustion chambers 2, and Ga1 is the amount of air flowing into the first exhaust branch pipe 19a.

A first temperature sensor 24a is attached to the first NOx catalyst 21a for detecting the temperature of the catalyst 21a. The temperature detected by the temperature sensor 24a is mainly used as a parameter for controlling the temperature of the first NOx catalyst 21a to be equal to or lower than a permissible upper limit temperature.

A first flow control valve 25a for controlling the flow rate of exhaust gas that passes through the first exhaust branch pipe 19a is disposed in the first exhaust branch pipe 19a downstream of the first NOx catalyst 21a. The flow rate of the exhaust gas passing through the first NOx catalyst 21a increases as the opening of the flow control valve 25a increases, and the flow rate of the exhaust gas passing through the first NOx catalyst 21a decreases as the opening of the flow control valve 25a decreases.

On the other hand, a second NOx catalyst 21b for removing NOx contained in the exhaust gas is disposed in the second exhaust branch pipe 19b. The second NOx catalyst 21b has the same function as the first NOx catalyst 21a. Also, a second fuel addition device 22b adapted to inject fuel to be added to the exhaust gas is attached to the second exhaust branch pipe 19b upstream of the second NOx catalyst 21b. The second fuel addition device 22b has the same function as the first fuel addition device 22a. A rich-gas supply device capable of delivering exhaust gas having a rich air/fuel ratio may be employed in place of the second fuel addition device 22b.

A second air/fuel sensor 23b for detecting the air/fuel ratio of the exhaust gas is attached to the second exhaust branch pipe 19b between the second fuel addition device 22b and the second NOx catalyst 21b. The second air/fuel sensor 23b has the same function as the first air/fuel sensor 23a. The air/fuel ratio of the exhaust gas mentioned herein means the ratio of air to fuel that is calculated according to an expression that $Ga2/(Q \times Ga2/Ga+Q2)$ where Q is the quantity of fuel injected from the fuel injectors 3 into the combustion chambers 2, Q2 is the quantity of fuel injected from the second fuel addition device 22b, Ga is the quantity of air drawn into the combustion chambers 2, and Ga2 is the quantity of air flowing into the second exhaust branch pipe 19b.

A second temperature sensor 24b is attached to the second NOx catalyst 21b for detecting the temperature of the catalyst 21b. The second temperature sensor 24b has the same function as the first temperature sensor 24a. A second flow control valve 25b for controlling the quantity of exhaust gas passing through the second exhaust branch pipe 19b is disposed in the second exhaust branch pipe 19b downstream of the second NOx catalyst 21b. The second flow control valve 25b has the same function as the first flow control valve 25a.

The opening of the first flow control valve 25a and the opening of the second flow control valve 25b are controlled by a common actuator 26. In the present embodiment of the invention, if the opening of one of the two flow control valves 25a, 25b is increased, the opening of the other flow control valve 25b, 25a is reduced by an amount corresponding to the amount of increase in the opening of the above-indicated one flow control valve 25a, 25b.

The NOx catalyst as mentioned above stores SOx contained in exhaust gas when an oxidizing atmosphere is present in the NOx catalyst, namely, when the exhaust gas flowing into the NOx catalyst has a lean air/fuel ratio. Thus, the NOx catalyst has a SOx storage function. If the NOx catalyst stores SOx, the amount of NOx that can be trapped by or stored in the NOx catalyst is reduced by an amount corresponding to the amount of SOx stored in the catalyst. On the other hand, the NOx catalyst releases SOx stored therein when the catalyst temperature becomes higher than a certain temperature (which will be referred to as "S release temperature") that is higher than the above-indicated NOx reduction temperature, and a reducing atmosphere is present in the NOx catalyst. Thus, SOx can be released from the NOx catalyst if the temperature of the NOx catalyst is raised to be equal to or higher than the S release temperature, and the air/fuel ratio of the exhaust gas flowing into the NOx catalyst is controlled to be rich (or slightly rich) or stoichiometric.

In the present embodiment of the invention, when the amount of SOx stored in the NOx catalyst reaches a permissible upper limit value, the temperature of the NOx catalyst is raised to the S release temperature, and exhaust gas having a rich air/fuel ratio (which will be called "rich gas") is supplied to the NOx catalyst, so that SOx is released from the NOx catalyst.

In another embodiment of the invention, a S trap material may be employed in lieu of the NOx catalyst. The S trap material traps sulfur oxides (SOx) by absorbing or adsorbing SOx contained in the exhaust gas when the exhaust gas flowing into the material has a lean air/fuel ratio. The S trap material then releases the SOx stored therein when the temperature becomes equal to or higher than the S release temperature, and the atmosphere inside the S trap material turns into a reducing atmosphere.

A particulate filter (which will be simply referred to as "filter") 27 capable of trapping particulates contained in exhaust gas is disposed in the common exhaust pipe 20. Also, a pressure sensor 28 for detecting the pressure of exhaust gas is attached to the common exhaust pipe 20 upstream of the filter 27. When the temperature of the filter 27 is higher than a certain temperature (which will be referred to as "particulate combustion temperature"), and an oxidizing atmosphere is present in the filter 27, the particulates trapped by the filter 27 burn off and are removed. It is thus possible to burn and remove the particulates trapped by the filter 27 by increasing the temperature of the filter 27 to the particulate combustion temperature and controlling the average air/fuel ratio of exhaust gas flowing into the filter 27 to be lean.

In the present embodiment of the invention, when the amount of particulates trapped by the filter 27 reaches a permissible upper limit value, the temperature of the filter 27 is increased to the particulate combustion temperature, and exhaust gas having a lean air/fuel ratio (which will be called "lean gas") is supplied to the filter 27, so that the particulates burn off and are thus removed from the filter 27.

The air/fuel ratio of the exhaust gas mentioned herein means the ratio of the quantity of air drawn into the combustion chambers 2 to the total quantity of fuel injected from the fuel injectors 3 into the combustion chambers 2 and fuel injected from the respective fuel addition devices 22a, 22b.

The above-described filter 27 may be replaced by another type of filter capable of trapping particulates in exhaust gas and having a function of oxidizing and removing the trapped particulates at a time. The filter oxidizes and removes the particulates when the temperature of the filter is higher than a certain temperature (which will be called "particulate oxidation/removal temperature") that is lower than the above-indicated particulate combustion temperature, and an oxidizing atmosphere is present in the filter. Where the filter having the oxidizing function is employed, the particulates trapped by the filter are oxidized and removed at a time when the filter temperature is increased to the particulate oxidation/removal temperature, and the average air/fuel ratio of the exhaust gas flowing into the filter is controlled to be lean.

Needless to say, the filter as described just above may function like the filter 27. Namely, if the temperature of the filter is increased to the particulate combustion temperature, and the average air/fuel ratio of the exhaust gas flowing into the filter is controlled to be lean, the particulates trapped by the filter burn off and are removed from the filter.

The filter as described above may be replaced by a further type of filter capable of trapping particulates contained in exhaust gas and having a continuous oxidizing function and a NOx storage function similar to that of NOx catalysts. More specifically, the filter is able to continuously oxidize and remove the trapped particulates within a short period of time when the filter temperature is higher than a certain temperature (which will be called "particulate continuous oxidation temperature") that is lower than the particulate oxidation/removal temperature, and an oxidizing temperature is present in the filter. The filter is also able to store NOx in the same manner as the NOx catalysts. By using the filter having the continuous oxidizing function, the particulates can be continuously oxidized and removed when the filter temperature is higher than the particulate continuous oxidation temperature, and an oxidizing atmosphere is present in the filter. The amount of the particulates that can be oxidized and removed per unit time (which will be called "oxidizable/removable particulate amount") increases as the filter temperature rises, and the oxidizable/removable particulate amount decreases as the filter temperature decreases.

Accordingly, depending upon the temperature of the filter, the amount of particulates discharged from the combustion chambers 2 per unit time (which will be called "discharged particulate amount") may exceed the amount of particulates that can be continuously oxidized and removed by the filter per unit time. In this case, the amount of particulates deposited on the filter increases, and the oxidation and removal of the particulates on the filter may be less likely to progress even when the discharged particulate amount becomes smaller than the oxidizable/removable particulate amount.

The above situation may be avoided by raising the temperature of the filter when the oxidizable/removable particulate amount is smaller than the discharged particulate amount so that the oxidizable/removable particulate amount becomes larger than the discharged particulate amount. In this manner, the amount of the particulates deposited on the filter may be kept equal to or smaller than a predetermined amount.

Needless to say, the filter of the type described just above may function like the above-described filter having the function of oxidizing and removing the trapped particulates at a time. Namely, if the filter temperature is increased to the particulate oxidation/removal temperature, and the average air/fuel ratio of the exhaust gas flowing into the filter is controlled to be lean, the particulates trapped by the filter are oxidized and removed at a time. In the case where a relatively large amount of particulates are deposited on the filter, and it is difficult to continuously oxidize and remove the deposited particulates, the filter temperature is raised to the particulate oxidation/removal temperature while the air/fuel ratio of the exhaust gas flowing into the filter is controlled to be lean, so that the deposited particulates can be oxidized and removed at a time.

The filter of the above type may also function like the filter 27. Namely, if the temperature of the filter is raised to the particulate combustion temperature, and the average air/fuel ratio of the exhaust gas flowing into the filter is controlled to be lean, the particulates trapped by the filter burn off and are removed from the filter.

In a further embodiment of the invention, the filter 27 as described above may be replaced by an oxidation catalyst simply having an oxidizing function.

Figure 2A:
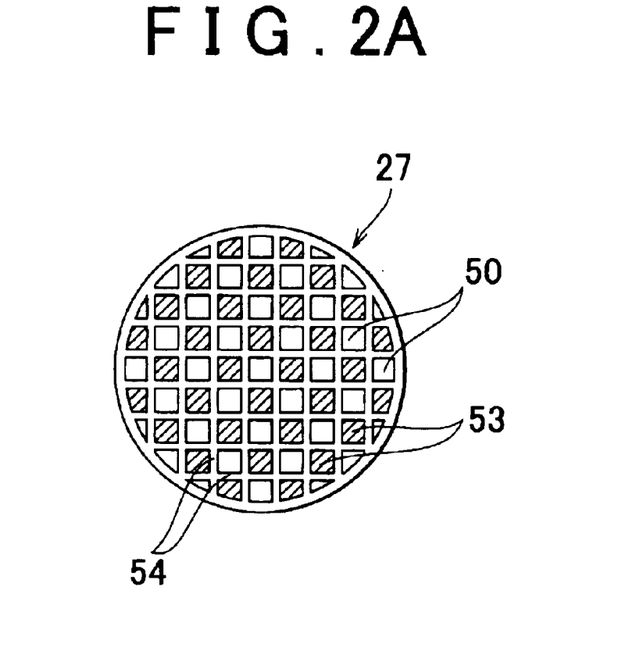
FIG. 2A is a view showing an end face of a particulate filter.
Figure 2B:
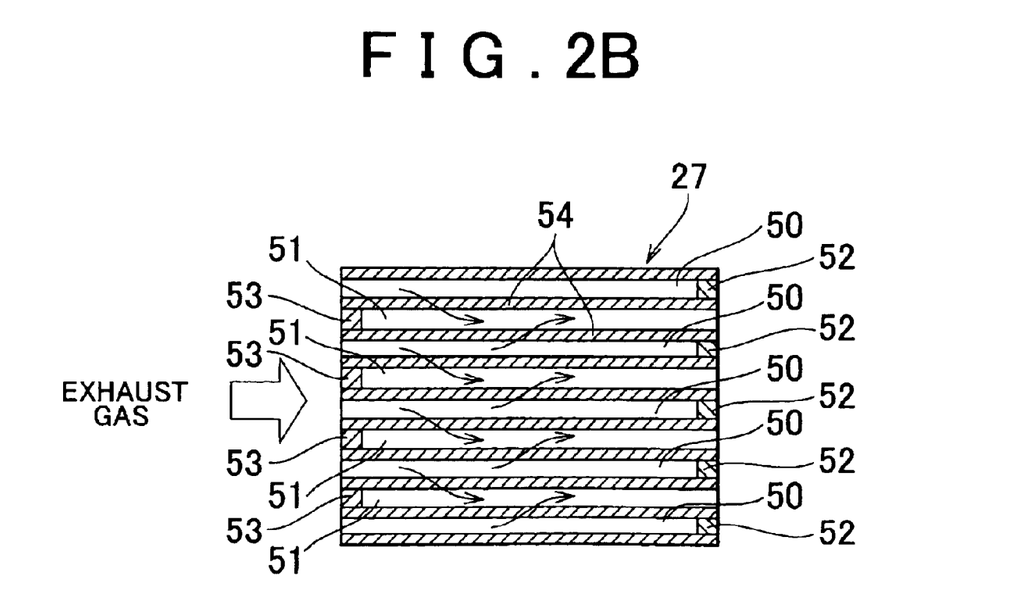
FIG. 2B is a view showing a vertical cross section of the particulate filter.

FIG. 2A shows an end face of the filter 27, and FIG. 2B shows a vertical cross section of the filter 27. As shown in FIG. 2A and FIG. 2B, the filter 27 includes partition walls 54 that provide a honeycomb structure.

In the filter 27, the partition walls 54 form a plurality of exhaust flow passages 50, 51 that extend in parallel with each other in the longitudinal direction of the filter 27. The exhaust flow passages 50 that provide about a half of the exhaust flow passages 50, 51 are closed at the downstream ends thereof by plugs 52. The exhaust flow passages 50 will be hereinafter called "exhaust gas inflow passages". The exhaust flow passages 51 that provide the remaining half of the exhaust flow passages 50, 51 are closed at the upstream ends thereof by plugs 53. The exhaust flow passages 51 will be hereinafter called "exhaust gas outflow passages". Each of the exhaust gas inflow passages 50 adjoins four of the exhaust gas outflow passages 51. On the other hand, each of the exhaust gas outflow passages 51 adjoins four of the exhaust gas inflow passages 50.

In operation, exhaust gas flows into the exhaust gas inflow passages 50. Since the partition walls 54 are formed of a porous material, such as cordierite, the exhaust gas in the exhaust gas inflow passages 50 passes through pores of the partition walls 54, and flows into the adjacent exhaust gas outflow passages 51, as indicated by arrows in FIG. 2B.

In the filter 27, a support layer made of, for example, alumina is formed over the entire area of the opposite wall surfaces of the partition walls 54 and wall surfaces that define the pores of the partition walls 54, and a precious metal catalyst and an active oxygen forming agent are supported on the support layer.

In the present embodiment, platinum (Pt) is used as the precious metal catalyst. The active oxygen forming agent is composed of at least one element selected from alkali metals, such as potassium (K), sodium (Na), lithium (Li), cesium (Cs) and rubidium (Rb), alkali earth metals, such as barium (Ba), calcium (Ca) and strontium (Sr), rare earth metals, such as lanthanum (La), yttrium (Y) and cerium (Ce), transition metals, such as iron (Fe), and carbon family elements, such as tin (Sn).

The active oxygen forming agent absorbs and stores oxygen when excess oxygen exists around the agent, and releases the stored oxygen in the form of active oxygen when the ambient oxygen concentration is reduced, thereby to form active oxygen. In the following, an active oxygen forming operation of the active oxygen forming agent will be explained with reference to an example in which platinum and potassium are carried on the support layer. It is, however, to be understood that similar active oxygen forming operations are performed when other precious metals, alkali metals, alkali earth metals, rare earth metals and transition metals are used as the precious metal catalyst and the active oxygen forming agent.

Where the air/fuel ratio of the exhaust gas is defined as the ratio of the air supplied to the intake passage to the fuel supplied to the combustion chambers 2 of the engine, the air/fuel ratio of the exhaust gas emitted from the compression ignition type internal combustion engine is normally lean. Accordingly, the exhaust gas that flows into the filter 27 contains a large quantity of excess air. Also, NO is produced in the combustion chambers 2 of the compression ignition type engine, and the exhaust gas emitted from the combustion chambers 2 contains NO. Thus, the exhaust gas containing excess oxygen and NO flows into the exhaust gas inflow passages 50 of the filter 27.

Figure 3A:
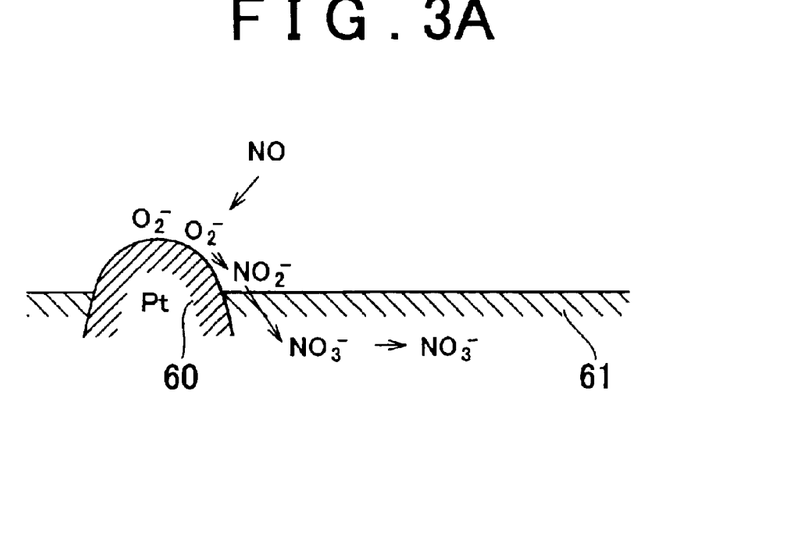
FIG. 3A is a view schematically showing a surface of a support later formed on a partition wall of the particulate filter.
Figure 3B:
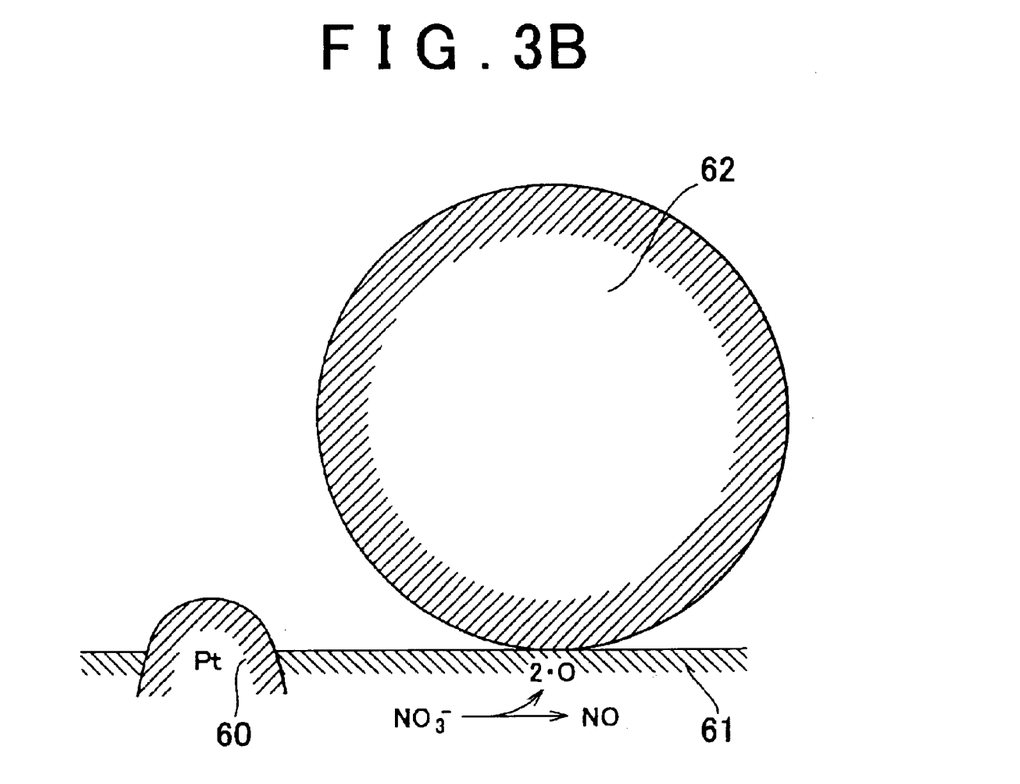
FIG. 3B is a view useful for explaining a particulate oxidizing function of the particulate filter.

FIG. 3A and FIG. 3B are enlarged views each schematically showing a surface of the support layer formed on the partition wall 54. In FIG. 3A and FIG. 3B, reference numeral 60 denotes a platinum particle, and reference numeral 61 denotes an active oxygen forming agent containing potassium.

When exhaust gas flows into the exhaust gas inflow passages 50 of the filter 27, oxygen ($O_2$) contained in the exhaust gas deposits on the surface of platinum in the form of $O_2^-$ or $O^{2-}$, as shown in FIG. 3A. NO in the exhaust gas reacts with $O_2^-$ or $O^{2-}$, to form $NO_2$. A part of $NO_2$ thus formed is oxidized on platinum, and is absorbed by and stored in the active oxygen forming agent 61, to be diffused into the active oxygen forming agent 61 in the form of nitric acid ion ($NO_3^-$) while combining with potassium (K), thereby forming potassium nitrate ($KNO_3$), as shown in FIG. 3A. Namely, the oxygen in the exhaust gas is absorbed and stored in the active oxygen forming agent 61 in the form of potassium nitrate ($KNO_3$).

In the meantime, particulates composed mainly of carbon (C) are also formed in the combustion chambers 2, and the resulting exhaust gas contains the particulates thus formed. When the exhaust gas flows into the exhaust gas inflow passages 50 or passes through the pores of the partition walls 54, the particulates contact with the surface of the active oxygen forming agent 61 and are deposited on the forming agent 61. In FIG. 3B, one of the particulates is denoted by 62.

With the particulate 62 thus deposited on the surface of the active oxygen forming agent 61, the oxygen concentration measured at a contact surface or interface between the particulate 62 and the active oxygen forming agent 61 is reduced. Namely, the oxygen concentration around the active oxygen forming agent 61 is reduced. With the oxygen concentration thus reduced, a difference in the oxygen concentration appears between the contact surface and the interior of the active oxygen forming agent 61 having a high oxygen concentration, whereby oxygen in the active oxygen forming agent 61 is apt to move toward the contact surface between the particulate 62 and the active oxygen forming agent 61. As a result, potassium nitrate ($KNO_3$) formed in the active oxygen forming agent 61 is dissolved into potassium (K), oxygen (O) and NO, and the oxygen moves toward the contact surface between the particulate 62 and the active oxygen forming agent 61 while NO is released from the active oxygen forming agent 61 to the outside.

Here, the oxygen that moves toward the contact surface between the particulate 62 and the active oxygen forming agent 61 is of a type that is dissolved from a compound such as potassium nitrate, and therefore has unpaired electrons. Thus, the oxygen released from the active oxygen forming agent 61 provides active oxygen having a considerably high reactivity. In this manner, the active oxygen forming agent 61 forms active oxygen. Meanwhile, the NO released to the outside is oxidized on platinum located on the downstream side, and is stored again in the active agent forming agent 61.

The active oxygen thus formed by the active oxygen forming agent 61 is consumed for oxidizing and removing the particulates deposited thereon. Namely, the particulates trapped on the filter 27 are oxidized and removed by active oxygen formed by the active oxygen forming agent 61.

As described above, the particulates trapped by the filter 27 are oxidized and removed by active oxygen having a high reactivity, without emitting luminous flame. If the particulates are removed through oxidation without emitting luminous flame in this manner, the temperature of the filter 27 is not excessively elevated, and therefore the filter 27 does not suffer from heat deterioration.

Furthermore, since active oxygen used for oxidizing and removing the particulates has a high reactivity, the particulates can be oxidized and removed even if the temperature of the filter 27 is relatively low. In this connection, it is to be noted that the temperature of exhaust gas emitted from the compression ignition type internal combustion engine is relatively low, and the temperature of the filter 27 is often relatively low. In this embodiment, the particulates trapped by the filter 27 continue to be oxidized and removed without requiring a special process for increasing the temperature of the filter 27.

The active oxygen forming agent 61 stores NOx in the form of nitric acid ions when excess oxygen exists around the agent 61, thereby to store oxygen. Namely, the active oxygen forming agent 61 absorbs and stores NOx when excess oxygen exists around the agent 61. If the ambient oxygen concentration is reduced, the active oxygen forming agent 61 releases NOx stored in the form of nitric acid ions, thereby to form active oxygen. Namely, the active oxygen forming agent 61 releases NOx when the ambient oxygen concentration is reduced. Thus, the active oxygen forming agent 61 also functions as a NOx storage agent or NOx trap.

As described above, the oxygen concentration around the active oxygen forming agent 16 is reduced when the particulates are deposited on the active oxygen forming agent 16 even though the atmosphere around the filter 27 is a lean atmosphere. Other than this case, the oxygen concentration around the active oxygen forming agent 61 may be reduced when the air/fuel ratio of the exhaust gas flowing into the filter 27 becomes rich, and a rich atmosphere exists around the filter 27.

When the oxygen concentration around the active oxygen forming agent 16 is reduced because of deposition of the particulates on the active oxygen forming agent 61 even though a lean atmosphere exists around the filter 27, NOx that is released due to the reduction of the oxygen concentration is absorbed and stored again in the active oxygen forming agent 61, as described above. On the other hand, NOx that is released when the air/fuel ratio of the exhaust gas flowing into the filter 27 becomes rich and the atmosphere around the filter 27 turns into a rich atmosphere is reduced and removed by hydrocarbons in the exhaust gas, utilizing the catalytic function of platinum. In other words, if the operation of the internal combustion engine is controlled so that exhaust gas having a rich air/fuel ratio is emitted from the engine, NOx stored in the active oxygen forming agent 61 can be reduced and removed by use of platinum. Thus, the filter 27 of the present embodiment may be said to include the active oxygen forming agent 61 and a NOx catalyst made of platinum.

The exhaust emission control system of the present embodiment further includes an electronic control unit (ECU) 30 that receives signals from the first and second air/fuel sensors 23a, 23b, first and second temperature sensors 24a, 24b and the pressure sensor 28, and other signals used for controlling the operations of the emission control system and the internal combustion engine. On the basis of the input signals from these sensors, the ECU 30 outputs signals to the fuel injectors 3, fuel addition devices 22a, 22b, flow control valves 25a, 25b, and so forth, so as to control the operations of the emission control system and the internal combustion engine. More specifically, the ECU 30 performs various controls as described later for, for example, controlling the temperature of the filter 27 to a target temperature, controlling the temperatures of the NOx catalysts 21a, 21b, and controlling the air/fuel ratio of exhaust gas that flows into the filter 27.

The exhaust emission control system according to the embodiment of the invention is able to remove or reduce four components, i.e., NOx, CO, HC and particulates. The NOx catalyst 21a, 21b of this embodiment has a plurality of exhaust flow passages defined by partition walls that provide a honeycomb structure, and is of a so-called monolith type in which its openings on the inlet and outlet sides of the exhaust flow passages are not closed at all. Thus, the NOx catalyst 21a, 21b provides a relatively small pressure loss. On the other hand, the filter 27 of this embodiment has a plurality of exhaust flow passages defined by partition walls formed of a porous material and providing a honeycomb structure, and is of a so-called wall flow type in which the openings of the exhaust flow passages are alternately closed by plugs on the inlet and outlet sides thereof. With this arrangement, the filter 27 provides a relatively large pressure loss.

In the present embodiment of the invention, the openings of the respective flow control valves 25a, 25b are controlled so that, when the amount of exhaust gas passing through one of the two NOx catalysts 21a, 21b is reduced, the amount of exhaust gas passing through the other NOx catalyst 21b, 21a is increased by a corresponding degree. With this arrangement, even if the opening of one of the flow control valves 25a, 25b is reduced so as to reduce the amount of exhaust gas passing through the above-indicated one of the NOx catalysts 21a, 21b, an increase of the pressure loss of the emission control system as a whole due to the reduction of the opening is relatively small.

When fuel to be supplied to the filter 27 is injected from the fuel addition device(s) 22a, 22b, the fuel flows into the filter 27 after passing through the NOx catalyst(s) 21a, 21b. The fuel is reformed when it passes through the NOx catalyst 21a, 21b, so that its reactivity is improved. Furthermore, a part of the fuel undergoes an oxidation reaction in the NOx catalyst, whereby the temperature of the exhaust gas that flows out of the NOx catalyst is increased. Since the fuel is supplied to the filter 27 with its reactivity improved, and high-temperature exhaust gas is also supplied to the filter 27, the fuel is sufficiently oxidized at an upstream end face of the filter 27. Accordingly, the fuel is prevented from being deposited on the upstream end face of the filter 27.

If fuel is injected from one of the fuel addition devices 22a, 22b so as to reduce and remove NOx stored in the corresponding NOx catalyst, for example, NOx is reduced and removed from the NOx catalyst, and the temperature of the exhaust gas flowing through the NOx catalyst is raised due to the reducing reaction. As a result, high-temperature exhaust gas is supplied to the filter 27, and therefore the temperature of the filter 27 is generally kept at a relatively high level in the exhaust emission control system of the present embodiment.

Where the filter 27 has a NOx storage function, the filter 27 also stores sulfur oxides (SOx) contained in the exhaust gas if the average air/fuel ratio of the exhaust gas flowing into the filter 27 is lean. The storage of SOx in the filter 27 has an adverse influence on oxidation and removal of particulates on the filter 27. Meanwhile, the filter 27 releases SOx stored therein when the filter temperature is higher than the S release temperature, and a reducing atmosphere is present in the filter 27. Thus, SOx can be released from the filter 27 when the filter temperature is raised to be equal to or higher than the S release temperature, and the average air/fuel ratio of the exhaust gas flowing into the filter 27 is controlled to be rich (or slightly rich), or stoichiometric.

In the following description, several examples of control schemes for raising the temperature of the filter 27 to a target temperature will be described. In operation of the exhaust emission control system as described above, the filter temperature is required to be raised to the target temperature, for example, (1) when the particulate oxidizing function of the filter 27 is to be promoted, or (2) when particulates trapped by the filter 27 are to be oxidized and removed from the filter 27 at a time, or (3) when SOx is to be released from the filter 27.

In the first example of control, when the filter temperature is required to be raised, a suitable amount of fuel is injected from one of the fuel addition devices 22a, 22b so that exhaust gas having a rich air/fuel ratio (i.e., rich gas) flows from the corresponding one of the NOx catalysts 21a, 21b, and a suitable amount of fuel is injected from the other fuel addition device 22b, 22a so that exhaust gas having a lean air/fuel ratio (i.e., lean gas) flows from the other NOx catalyst 21b, 21a. As a result, the rich gas is supplied from one of the exhaust branch pipes 19a, 19b to the filter 27, and the lean gas is supplied from the other exhaust branch pipe 19b, 19a to the filter 27. Namely, the rich gas and the lean gas are supplied to the filter 27. In this case, fuel in the rich gas reacts with air in the lean gas in the filter 27, whereby the filter temperature is raised.

In general, when fuel is supplied from the fuel addition device 22a, 22b to the NOx catalyst 21a, 21b, the fuel undergoes oxidation in the NOx catalyst, and therefore the temperature of the NOx catalyst is raised. In the case where fuel is injected from both of the fuel addition devices 22a, 22b so as to supply rich gas to the filter 27, namely, where rich gas is supplied to both of the NOx catalysts 21a, 21b, the temperatures of both of the NOx catalysts 21a, 21b may be raised to the permissible upper limit temperature. In the first control example, however, lean gas is supplied to at least one of the NOx catalysts 21a, 21b even in the case where rich gas is to be supplied to the filter 27, and therefore the temperature of at least one of the NOx catalysts 21a, 21b is prevented from being raised to the permissible upper limit temperature.

If the temperature of the NOx catalyst is raised to the permissible upper limit temperature, the NOx conversion rate of the NOx catalyst may be reduced. According to the first control example, however, the temperature of at least one of the NOx catalysts 21a, 21b is prevented from being raised to the permissible upper limit temperature, and therefore the NOx conversion rate is kept sufficiently high with regard to the at least one NOx catalyst.

In the first control example, there is no need to change operating parameters of the internal combustion engine so as to raise the filter temperature. Thus, the filter temperature can be raised no matter what operating conditions the engine is currently placed in.

As described above, a part of the fuel supplied to the NOx catalyst is oxidized in the NOx catalyst, and the temperature of the exhaust gas is raised due to the oxidation of the fuel. Accordingly, the temperature of exhaust gas flowing into the filter 27 is relatively high. With the high-temperature exhaust gas thus supplied, the temperature of the filter 27 measured at around the upstream end face thereof is also increased. Accordingly, the particulate oxidizing function of the filter 27 at around the upstream end face is sufficiently promoted when the particulate oxidizing function of the filter 27 is to be promoted, or the particulates deposited at around the upstream end face of the filter 27 are sufficiently oxidized and removed when the particulates on the filter 27 are to be oxidized and removed at a time, or SOx is sufficiently released from the upstream end face of the filter 27 when SOx is to be released from the filter 27.

In the first control example, a reducing atmosphere exists in one of the NOx catalysts 21a, 21b to which the rich gas is supplied, and therefore NOx is reduced and removed from the NOx catalyst. Accordingly, the number of times or frequency of execution of separate control for reducing NOx at the NOx catalyst is reduced. If the temperature of the NOx catalyst is raised to the S release temperature, SOx is released from the NOx catalyst since the reducing atmosphere exists in the NOx catalyst. In this case, the number of times or frequency of execution of separate control for releasing SOx from the NOx catalyst is reduced. On the other hand, the NOx catalyst 21a, 21b to which the lean gas is supplied successively traps and stores NOx in the exhaust gas flowing into the catalyst, whereby deterioration of exhaust emissions as a whole is suppressed.

In the first control example, the amount of fuel injected from the fuel addition device 22a, 22b to the NOx catalyst 21a, 21b to which lean gas is to be supplied may be equal to zero, or may be equal to a non-zero value as long as lean gas flows from the NOx catalyst in question.

In the exhaust emission control system of the present embodiment, the fuel addition devices 22a, 22b are disposed in the respective exhaust branch pipes 19a, 19b, so that different amounts of fuel can be supplied to the NOx catalysts 21a, 21b. Basically, the amount of fuel to be injected from each fuel addition device (which will be referred to as "fuel addition amount" when appropriate) is calculated based on the flow rate of the exhaust gas flowing through the corresponding NOx catalyst, and the target air/fuel ratio of the exhaust gas. Namely, the fuel addition amount of the fuel addition device is increased as the flow rate of the exhaust gas flowing through the corresponding NOx catalyst increases, whereas the fuel addition amount of the fuel addition device is reduced as the flow rate of the exhaust gas flowing through the corresponding NOx catalyst decreases. Also, the fuel addition amount of the fuel addition device is increased as the air/fuel ratio of the relevant exhaust gas is leaner (i.e., larger) than the target air/fuel ratio, and the fuel addition amount of the fuel addition device is reduced as the air/fuel ratio of the relevant exhaust gas is richer (i.e., smaller) than the target air/fuel ratio.

In the present embodiment, the openings of the flow control valves 25a, 25b are basically kept equal to each other, but may be made different from each other according to a request. If the opening of the flow control valve 25a, 25b is reduced, the flow rate of exhaust gas passing through the corresponding NOx catalyst 21a, 21b is reduced, and therefore the fuel addition amount of the corresponding fuel addition device 22a, 22b is reduced. If the opening of the flow control valve 25a, 25b is increased, to the contrary, the flow rate of exhaust gas passing through the corresponding NOx catalyst 21a, 21b is increased, and therefore the fuel addition amount of the corresponding fuel addition device 22a, 22b is increased.

As the degree of richness of the air/fuel ratio of the exhaust gas flowing into one of the exhaust branch pipes 19a, 19b increases, the amount of fuel to be injected from the corresponding fuel addition device 22a, 22b for controlling the air/fuel ratio of exhaust gas flowing into the corresponding NOx catalyst 21a, 21b to the target air/fuel ratio is reduced. In this case, therefore, the amount of fuel added from the corresponding fuel addition device 22a, 22b is reduced. On the other hand, as the degree of leanness of the air/fuel ratio of the exhaust gas flowing into the exhaust branch pipe 19a, 19b increases, the amount of fuel to be injected from the corresponding fuel addition device 22a, 22b for controlling the air/fuel ratio of exhaust gas flowing into the corresponding NOx catalyst 21a, 21b to the target air/fuel ratio is increased. In this case, therefore, the amount of fuel added from the fuel addition device 22a, 22b is increased.

Also, as the degree of richness of the rich gas flowing from the NOx catalyst 21a, 21b increases, a larger amount of fuel is contained in the rich gas, and therefore the amount of fuel supplied to the filter 27 increases. In this context, if the lean gas supplied to the filter 27 contains oxygen in an amount large enough to oxidize the fuel in the rich gas, the quantity of heat generated due to the oxidation of the fuel in the filter 27 is increased.

The above-described control for controlling the fuel addition amounts of the fuel addition devices and the openings of the flow control valves so that rich gas flows from one of the NOx catalysts and lean gas flows from the other NOx catalyst will be hereinafter called "half-rich/half-lean control".

In the following description of the half-rich/half-lean control, one of the exhaust branch pipes that emits rich gas will be called "rich-side exhaust branch pipe", and the fuel addition device, NOx catalyst and the flow control valve disposed in the rich-side exhaust branch pipe will be called "rich-side fuel addition device", "rich-side NOx catalyst", and "rich-side flow control valve", respectively. Similarly, the other exhaust branch pipe that emits lean gas will be called "lean-side exhaust branch pipe", and the fuel addition device, NOx catalyst, and the flow control valve disposed in the lean-side exhaust branch pipe will be called "lean-side fuel addition device", "lean-side NOx catalyst", and "lean-side flow control valve".

Next, a second example of control performed on the exhaust emission control system of the illustrated embodiment will be described. In the second example, when it is required to promote the function of the filter 27 to oxidize the particulates, the half-rich/half-lean control is executed so that the average air/fuel ratio of the exhaust gas flowing into the filter 27 becomes lean. With this control, the filter temperature is raised and an oxidizing atmosphere is maintained in the filter 27, so that the particulate oxidizing function of the filter 27 is promoted.

Next, a third example of control performed on the exhaust emission control system in which the filter 27 has an oxidizing function will be described. When particulates trapped by the filter 27 are required to be oxidized and removed at a time, the half-rich/half-lean control is executed so that the filter temperature is raised to the particulate oxidation/removal temperature, and the average air/fuel ratio of the exhaust gas flowing into the filter 27 becomes lean. With this control, the filter temperature is controlled to the particulate oxidation/removal temperature, and an oxidizing atmosphere is maintained in the filter 27, whereby the particulates in the filter 27 are oxidized and removed at a time.

Next, a fourth example of control performed on the exhaust emission control system in which the filter 27 has an oxidizing function will be described. When particulates trapped by the filter 27 are required to be burned and removed from the filter 27, the half-rich/half-lean control is executed so that the filter temperature is raised to the particulate combustion temperature, and the average air/fuel ratio of the exhaust gas flowing into the filter 27 becomes lean.

Next, a fifth example of control performed on the exhaust emission control system in which the filter 27 has a NOx storage function will be described. When it is required to release SOx from the filter 27, the half-rich/half-lean control is executed so that the filter temperature is raised to the S release temperature, and the average air/fuel ratio of the exhaust gas flowing into the filter 27 becomes rich (or slightly rich) or stoichiometric. With this control, the filter temperature is controlled to the S release temperature, and a reducing atmosphere is maintained in the filter 27, whereby the SOx is released from the filter 27.

If a strong reducing atmosphere is present in the filter 27 when SOx is released from the filter 27, a part of the released SOx is reduced to form hydrogen sulfide ($H_2S$). In the fifth control example, however, if the average air/fuel ratio of the exhaust gas flowing into the filter 27 is controlled to be slightly rich or stoichiometric, a weak reducing atmosphere is maintained in the filter 27, and therefore formation of $H_2S$ in the filter 27 is suppressed. It is thus preferable in the fifth example to execute the half-rich/half-lean control so that the average air/fuel ratio of the exhaust gas flowing into the filter 27 becomes slightly rich or stoichiometric, so as to suppress formation of $H_2S$ in the filter 27.

While some examples of control for raising the temperature of the filter 27 to the target temperature have been described above, other examples of control for controlling the temperatures of the NOx catalysts, controlling the temperature of the filter 27, controlling the average air/fuel ratio of exhaust gas flowing into the filter 27, and so forth will be described below.

A sixth example of control, which may be combined with any of the first through fifth control examples, will be now described. In the sixth control example, the temperature of the rich-side NOx catalyst is raised to the S release temperature. Namely, the half-rich/half-lean control is executed so that the temperature of the rich-side NOx catalyst is raised to the S release temperature. With this control, SOx is released from the rich-side NOx catalyst.

It is to be noted that in the sixth control example, SOx is released not from both of the rich-side and lean-side NOx catalysts, but from only one of the NOx catalysts (i.e., the rich-side NOx catalyst). Thus, the sixth control example is advantageous in that the concentration of SOx released per unit time from the exhaust emission control system is relatively low. If the control of the sixth example is performed on a modified exhaust emission control system in which the filter 27 is omitted from the emission control system of FIG. 1, the modified emission control system is also advantageous in that the concentration of SOx released per unit time from the system is relatively low since SOx is released not from both of the NOx catalysts but from only one of the NOx catalysts.

In the sixth control example, the air/fuel ratios of exhaust gases flowing from the rich-side and lean-side NOx catalysts can be controlled as desired independently of each other, and therefore the quantities of fuel and air supplied to the filter 27 can also be controlled as desired. This means that the quantity of fuel that undergoes oxidizing reaction in the filter 27 can be controlled, and therefore the quantity of heat generated at the filter 27 can also be controlled. Thus, the sixth control example is advantageous in that the filter temperature can be controlled as desired while SOx is being released from the NOx catalyst.

Next, a seventh example of control, which may be combined with any of the first through fifth control examples, will be described. In the seventh control example, when the filter 27 has an oxidizing function, and the average air/fuel ratio of the exhaust gas flowing into the filter 27 is controlled to be lean, the half-rich/half-lean control is executed so that the temperature of the rich-side NOx catalyst is raised to the S release temperature, and the filter temperature is kept lower than a sulfate formation temperature at which sulfate is formed. In the exhaust emission control system of the illustrated embodiment, SOx released from the NOx catalyst flows into the filter 27. If the filter 27 has an oxidizing function, and the average air/fuel ratio of the exhaust gas flowing into the filter 27 is lean, with the filter temperature being higher than the sulfate formation temperature, sulfate is undesirably formed from SOx due to the oxidizing function of the filter 27. In the seventh control example, however, the filter temperature is kept lower than the sulfate formation temperature while SOx is being released from the NOx catalyst, so that formation of sulfate in the filter 27 is suppressed.

In the seventh control example, like the sixth control example, the air/fuel ratios of exhaust gases flowing from the rich-side and lean-side NOx catalysts can be controlled independently of each other, and therefore the quantities of fuel and air supplied to the filter 27 can also be controlled. Thus, the seventh control example is advantageous in that the filter temperature is controllable while SOx is being released from the NOx catalyst.

When SOx is released from the rich-side NOx catalyst, three components, i.e., HC, CO and $H_2S$, are also released from this NOx catalyst. In the exhaust emission control system of the illustrated embodiment, these three components flow into the filter 27. Since an oxidizing atmosphere is maintained in the filter 27 in the seventh control example, these three components are oxidized and removed by the filter 27.

Needless to say, the function of the filter 27 to oxidize particulates is promoted, or particulates trapped by the filter 27 are oxidized and removed at a time, or particulates trapped by the filter 27 are burned and removed, depending upon the filter temperature measured at the time when the control of the seventh example is implemented.

Next, an eighth example of control performed on the exhaust emission control system in which the filter 27 has an oxidizing function will be described. In the eighth control example, the half-rich/half-lean control is executed so that the temperature of the rich-side NOx catalyst is raised to the S release temperature, and the average air/fuel ratio of the exhaust gas flowing into the filter 27 becomes lean (or weakly lean). Generally, if rich gas is supplied to a NOx catalyst so as to release SOx from the NOx catalyst, exhaust gas containing three components, i.e., HC, CO and $H_2S$, flows from the NOx catalyst. In the exhaust emission control system of the illustrated embodiment, these three components flow into the filter 27. Since the filter 27 has an oxidizing function, and an oxidizing atmosphere is maintained in the filter 27 in the eighth control example, these three components are oxidized and removed by the filter 27.

Where the filter 27 has an oxidizing function, and a strong oxidizing atmosphere is present in the filter 27, $H_2S$ that flows into the filter 27 may be oxidized due to the oxidizing function of the filter 27, and sulfate may be undesirably formed. In the eighth control example, however, if the average air/fuel ratio of the exhaust gas that flows into the filter 27 is controlled to be weakly lean, a weak oxidizing atmosphere is maintained in the filter 27 though it has an oxidizing function. In this case, formation of sulfate in the filter 27 is advantageously suppressed.

Next, a ninth example of control performed on the exhaust emission control system in which the filter 27 has an oxidizing function will be described. In the ninth control example, when it is required to release SOx from both of the NOx catalysts, the amounts of fuel added from the fuel addition devices and the openings of the flow control valves are controlled so that the temperatures of both of the NOx catalysts are raised to the S release temperature, and rich gas is supplied to both of the NOx catalysts, while the average air/fuel ratio of the exhaust gas flowing into the filter 27 is controlled to be rich (or weakly rich) or stoichiometric. With this control, SOx is released from both of the NOx catalysts.

In the ninth control example, a reducing atmosphere is maintained in the filter 27, and therefore SOx that flows from the NOx catalysts into the filter 27 are not oxidized at the filter 27. Thus, the ninth control example is advantageous in that formation of sulfate at the filter 27 is suppressed.

If the control of the ninth example is executed when the filter 27 has a NOx reducing function as well as the oxidizing function, NOx is advantageously reduced at the filter 27.

Needless to say, if the filter temperature reaches the S release temperature when the control of the ninth example is executed, SOx is released from the filter 27.

Next, a tenth example of control performed on the exhaust emission control system in which the filter 27 has a NOx storage function will be described. In the tenth control example, when it is required to release SOx from both of the NOx catalysts and also release SOx from the filter 27, the amounts of fuel added from the fuel addition devices and the openings of the flow control valves are controlled so that (1) the temperatures of both of the NOx catalysts are raised to the S release temperature, (2) rich gas is supplied to both of the NOx catalysts, (3) the filter temperature is raised to the S release temperature, and (4) the average air/fuel ratio of the exhaust gas flowing into the filter 27 is controlled to be rich (or weakly rich) or stoichiometric. With this control, SOx is released from the filter 27 as well as the NOx catalysts.

Next, an eleventh example of control performed on the exhaust emission control system in which the filter 27 has a NOx storage function will be described. In the eleventh control example, when it is required to release SOx from one of the NOx catalysts, and also release SOx from the filter 27, the half-rich/half-lean control is executed so that (1) the temperature of the rich-side NOx catalyst is raised to the S release temperature, (2) the filter temperature is raised to the S release temperature, and (3) the average air/fuel ratio of the exhaust gas flowing into the filter 27 is controlled to be rich (or weakly rich) or stoichiometric. With this control, SOx is released from the rich-side NOx catalyst, and is also released from the filter 27.

In the eleventh control example, a reducing atmosphere is maintained in the filter 27, and therefore SOx that flows from the NOx catalyst into the filter 27 is prevented from being oxidized at the filter 27. Thus, the eleventh control example is advantageous in that formation of sulfate is suppressed.

Generally, if SOx is present in the filter 27 under conditions that the filter 27 has an oxidizing function and a strong reducing atmosphere exists in the filter 27, the SOx is reduced into hydrogen sulfide ($H_2S$). In the eleventh control example, however, even in the case where the filter 27 has an oxidizing function as well as the NOx storage function, a weak reducing atmosphere is maintained in the filter 27 if the average air/fuel ratio of the exhaust gas flowing into the filter 27 is controlled to be weakly rich or stoichiometric, and therefore SOx that is discharged from the NOx catalyst and flows into the filter 27, or SOx discharged from the filter 27 itself, is hardly converted to $H_2S$ in the filter 27. In this case, the eleventh control example is advantages in that formation of $H_2S$ in the filter 27 is suppressed or prevented.

Next, a twelfth example of control will be described. In the twelfth control example, the filter temperature is raised to the S release temperature before the control of the eleventh example is executed. Namely, in the twelfth control example, where the filter 27 has a NOx storage function, the half-rich/half-lean control is executed so that the filter temperature is initially raised to the S release temperature, then the temperature of the rich-side NOx catalyst is raised to the S release temperature, and the average air/fuel ratio of the exhaust gas that flows into the filter 27 is controlled to be rich (or weakly rich) or stoichiometric. With this control, the filter temperature is surely controlled to the S release temperature without fail.

Next, a thirteenth example of control will be described. In the thirteenth control example, when the half-rich/half-lean control is executed so that the average air/fuel ratio of the exhaust gas flowing into the filter 27 becomes lean or equal to the stoichiometric air/fuel ratio, fuel is injected from both of the fuel addition devices before execution of the half-rich/half-lean control. Since the fuel injected from both of the fuel addition devices is oxidized at both of the NOx catalysts, and the temperature of the exhaust gases passing through the NOx catalysts during the oxidation is increased, high-temperature exhaust gas is supplied to the filter 27. If the half-rich/half-lean control is executed in this condition, HC and CO discharged from the rich-side NOx catalyst are oxidized and removed by the filter 27 since the filter temperature at the time of execution of the half-rich/half-lean control has been raised to a sufficiently high level according to the thirteenth control example.

In the thirteenth control example, since the exhaust gas whose temperature has been raised due to the oxidizing reaction of the fuel at both of the NOx catalysts is supplied to the filter 27, the temperature of the filter 27 is raised more quickly as compared with the case where exhaust gas whose temperature has been raised due to the oxidizing reaction of fuel at one of the NOx catalysts is supplied to the filter 27.

Next, a fourteenth example of control will be described. In the fourth control example, the half-rich/half-lean control is executed so that rich gas is supplied to at least one of the NOx catalysts without increasing the filter temperature while the temperature of the NOx catalyst(s) is raised to the S release temperature. After the amount of SOx flowing from the NOx catalyst(s) reaches its peak, the temperature of the filter 27 is raised to the S release temperature, and the average air/fuel ratio of exhaust gas flowing into the filter 27 is controlled to be rich (or weakly rich) or stoichiometric through the half-rich/half-lean control. With this control, the amount of SOx flowing from the NOx catalyst(s) into the filter 27 becomes small by the time when the temperature of the filter 27 is raised to the S release temperature. According to the fourteenth control example, therefore, formation of sulfate or $H_2S$ at the filter 27 is surely suppressed.

Next, a fifteenth example of control will be described. In the fifteenth control example, when it is required to reduce and remove NOx in the lean-side NOx catalyst where the amount of fuel added to the lean-side NOx catalyst is equal to zero under half-rich/half-lean control, rich gas is periodically supplied to the lean-side NOx catalyst, i.e., rich spikes are performed, during execution of the half-rich/half-lean control. With this control, NOx is reduced and removed in the lean-side NOx catalyst as well as the rich-side NOx catalyst.

Next, a sixteenth example of control will be described. In the sixteenth control example, when the temperature of the rich-side NOx catalyst reaches the permissible upper limit temperature during execution of the half-rich/half-lean control, the opening of the rich-side flow control valve is reduced or the opening of the lean-side flow control valve is increased while the amount of fuel added from the rich-side fuel addition device is maintained at substantially the same level. As a result, the amount of exhaust gas passing through the rich-side NOx catalyst is reduced. In this case, the amount of fuel added from the rich-side fuel addition device is reduced, and therefore the temperature of the rich-side NOx catalyst is lowered.

Next, a seventeenth example of control will be described. In the seventeenth control example, when it is required to lower the temperature of the rich-side NOx catalyst during execution of the half-rich/half-lean control, the NOx catalyst to which rich gas is supplied and the NOx catalyst to which lean gas is supplied are switched from each other in predetermined timing. Namely, rich gas is supplied to the NOx catalyst to which lean gas was previously supplied, and lean gas is supplied to the NOx catalyst to which rich gas was previously supplied. With this control, lean gas is supplied to the originally rich-side NOx catalyst, and therefore the temperature of this NOx catalyst can be reduced.

Furthermore, according to the seventeenth control example, rich gas and lean gas are alternately supplied to each of the NOx catalysts, and therefore NOx is reduced at both of the NOx catalysts.

In the seventeenth control example, the above-indicated predetermined timing may be determined, for example, such that switching occurs at a time when the amount of NOx stored in the NOx catalyst reaches its upper limit value.

Next, an eighteenth example of control will be described. In the eighteenth control example, during half-rich/half-lean control, the NOx catalyst to which rich gas is supplied and the NOx catalyst to which lean gas is supplied are switched from each other so that the temperatures of both of the NOx catalysts are kept equal to or lower than the permissible upper limit temperature. With this control, the temperature of each NOx catalyst is kept equal to or lower than its permissible upper limit temperature during execution of the half-rich/half-lean temperature.

Next, a nineteenth example of control will be described. In the nineteenth control example, when the filter temperature is lower than the fuel oxidation temperature, rich gas is temporarily supplied to both of the NOx catalysts so that the filter temperature is raised to the fuel oxidation temperature before execution of the half-rich/half-lean control. In this connection, if the filter temperature is lower than the fuel oxidation temperature, fuel is not oxidized in the filter 27 even if fuel and air are supplied to the filter 27, and the filter temperature cannot be raised in this condition. In the nineteenth control example in which rich gas is temporarily supplied to the NOx catalysts, fuel in the rich gas is oxidized in the NOx catalysts, and therefore the temperature of exhaust gas flowing out of the NOx catalysts is raised. With the resulting high-temperature exhaust gas flowing into the filter 27, the filter temperature is raised. Since the half-rich/half-lean control is executed after the filter temperature reaches the fuel oxidation temperature, the fuel supplied to the filter 27 is oxidized in the filter 27, and the filter temperature is accordingly raised.

A twentieth example of control is applied to the case where the filter 27 has an oxidizing function and the half-rich/half-lean control is executed so that the air/fuel ratio of exhaust gas flowing into the filter 27 becomes lean, as in the above-described control examples. In the twentieth control example, fuel is periodically injected from both of the fuel addition devices to the filter 27 so that rich gas is periodically supplied to the filter 27 before execution of the half-rich/half-lean control, and thereafter the half-rich/half-lean control is executed. In general, SOx is adsorbed on the filter 27. In this case, if the filter 27 has an oxidizing function and the filter temperature rises to the sulfate formation temperature while the air/fuel ratio of exhaust gas flowing into the filter 27 is lean, sulfate is undesirably formed from the SOx adsorbed on the filter 27.

If, however, rich gas is periodically supplied to the filter 27 in the above situation, the SOx adsorbed on the filter 27 is released from the filter 27. In the twentieth control example, therefore, almost no SOx is adsorbed on the filter 27 when the half-rich/half-lean control is executed. Thus, formation of sulfate at the filter 27 is suppressed during execution of the half-rich/half-lean control.

Next, a twenty-first example of control performed on the exhaust emission control system in which the filter 27 has an oxidizing function will be described. In the twenty-first control example, when it is required to reduce and remove NOx from at least one of the NOx catalysts, fuel is injected from at least one of the fuel addition devices so that rich gas is periodically supplied to the at least one NOx catalyst, and the average air/fuel ratio of exhaust gas flowing into the filter 27 becomes lean. With this control, since the rich gas is periodically supplied to the at least one NOx catalyst, reduction of NOx takes place at the NOx catalyst(s) supplied with the rich gas.

While HC and CO flowing into the NOx catalyst that is performing NOx reduction flow out of the same NOx catalyst without being oxidized or removed, the HC and CO flowing out of the NOx catalyst are advantageously oxidized and removed by the filter 27 since the filter 27 has an oxidizing function and the average air/fuel ratio of exhaust gas flowing into the filter 27 is controlled to be lean in the twenty-first control example.

In the above-described control examples, the openings of the flow control valves may be controlled to be different from each other as requested during execution of the half-rich/half-lean control. For example, in a twenty-second example of control, the openings of the flow control valves are controlled during the half-rich/half-lean control so that the filter temperature is kept equal to or lower than its permissible upper limit temperature (e.g., sulfate formation temperature or a temperature at which heat deterioration of the filter may be induced). With the openings of the flow control valves thus controlled, the amount of exhaust gas that flows from each NOx catalyst is changed, and the amounts of rich gas and lean gas supplied to the filter are accordingly changed. Namely, in the twenty-second control example, the proportions of the rich gas and the lean gas in the exhaust gas supplied to the filter are controlled during execution of the half-rich/half-lean control so that the filter temperature is kept equal to or lower than the permissible upper limit temperature.

With the above control, if the proportion of the rich gas increases and the proportion of the lean gas is accordingly reduced, the filter temperature is elevated, or the rate of increase of the filter temperature increases. If the proportion of the rich gas is reduced and the proportion of the lean gas is accordingly increased, the filter temperature is lowered, or the rate of increase of the filter temperature decreases. In this manner, the filter temperature is kept equal to or lower than its permissible upper limit temperature in the twenty-second control example.

In the case where SOx is released from the rich-side NOx catalyst under the half-rich/half-lean control, for example, if it is required to sufficiently release SOx from a region in the vicinity of the upstream end face of the rich-side NOx catalyst, the opening of the rich-side flow control valve may be reduced to be smaller than that of the lean-side flow control valve during the half-rich/half-lean control. Generally, when rich gas is supplied from the upstream side of the NOx catalyst to the NOx catalyst so as to release SOx from the NOx catalyst, SOx is less likely to be released from the region in the vicinity of the upstream end face of the NOx catalyst.

If the opening of the rich-side flow control valve is made smaller than that of the lean-side flow control valve, the flow rate of exhaust gas passing through the rich-side NOx catalyst is relatively reduced, which results in a reduction in a difference between the temperature measured in an upstream region of the NOx catalyst and the temperature measured in a downstream region of the NOx catalyst. Due to the reduction in the temperature difference between the upstream region of the NOx catalyst and the downstream region thereof, SOx is sufficiently released from the region in the vicinity of the upstream end face of the NOx catalyst as well as the downstream end face. Thus, in this example, when SOx is released from the rich-side NOx catalyst under the half-rich/half-lean control, SOx can be sufficiently released from the region in the vicinity of the upstream end face of the NOx catalyst.

When it is required to lower the temperature of the rich-side NOx catalyst during half-rich/half-lean control, for example, the opening of the rich-side flow control valve may be controlled to be smaller than that of the lean-side flow control valve. With this control, the flow rate of exhaust gas that passes through the rich-side NOx catalyst is relatively reduced. As a result, the amount of fuel added from the rich-side fuel addition device is reduced. With the fuel addition amount thus reduced, the amount of fuel that is oxidized at the rich-side NOx catalyst is reduced, and therefore the quantity of heat generated at the rich-side NOx catalyst is reduced. Consequently, the temperature of the rich-side NOx catalyst is lowered in this example.

When it is required to elevate the temperature of the rich-side NOx catalyst during half-rich/half-lean control, for example, the opening of the lean-side flow control valve may be controlled to be smaller than that of the rich-side flow control valve. With this control, the flow rate of exhaust gas that passes through the lean-side NOx catalyst is relatively reduced, and accordingly the amount of exhaust gas that passes through the rich-side NOx catalyst is relatively increased. As a result, the amount of fuel added from the rich-side fuel addition device is increased. With the fuel addition amount thus increased, the amount of fuel that is oxidized at the rich-side NOx catalyst is increased, and therefore the quantity of heat generated at the rich-side NOx catalyst is increased. Consequently, the temperature of the rich-side NOx catalyst is elevated in this example.

In another example of control, the filter temperature is controlled during half-rich/half-lean control, by controlling the air/fuel ratio of exhaust gas emitted from the combustion chambers 2 and the total amount of fuel added from the fuel addition devices. In other words, the air/fuel ratio of the exhaust gas emitted from the combustion chambers 2 and the total amount of fuel added from the fuel addition devices are controlled, depending upon the filter temperature, so that the filter temperature becomes equal to the target temperature.

If the filter temperature does not reach the target temperature during execution of the half-rich/half-lean control, for example, the air/fuel ratio of the exhaust gas emitted from the combustion chambers 2 is shifted to the lean side, and the total amount of fuel injected from the fuel addition devices is increased. With this control, the amounts of fuel and oxygen supplied to the filter 27 are increased, whereby the temperature of the filter 27 is raised.

If the filter temperature exceeds the target temperature during execution of the half-rich/half-lean control, on the other hand, the air/fuel ratio of the exhaust gas emitted from the combustion chambers 2 is shifted to the rich side, and the total amount of fuel injected from the fuel addition devices is reduced. With this control, the amounts of fuel and oxygen supplied to the filter 27 are reduced, whereby the temperature of the filter 27 is lowered.

In addition to the control of the air/fuel ratio of the exhaust gas emitted from the combustion chambers 2 and the total amount of fuel injected from the fuel addition devices during the half-rich/half-lean control, or in place of this control, the filter temperature may be controlled by controlling the temperature of exhaust gas emitted from the combustion chambers 2. More specifically, the temperature of the exhaust gas emitted from the combustion chambers 2 is raised when the filter temperature does not reach the target temperature, and the temperature of the exhaust gas emitted from the combustion chambers 2 is lowered when the filter temperature exceeds the target temperature.

In the above-described control examples, if the purpose of executing the half-rich/half-lean control is to simply raise the filter temperature to the target temperature, the half-rich/half-lean control is finished when the filter temperature reaches the target temperature.

As described above, the temperature of the NOx catalyst (s) may reach its permissible upper limit temperature when the total amount of fuel added from the fuel addition devices is increased or the amount of fuel added from the rich-side fuel addition device is increased. In this case, the above-described control is stopped.

In the exhaust emission control system of the illustrated embodiment, the total amount of fuel added from the fuel addition devices during half-rich/half-lean control is determined based on the total amount and air/fuel ratio of exhaust gas emitted from the combustion chambers 2. More specifically, the total amount of fuel added from the fuel addition devices increases as the total amount of the exhaust gas emitted from the combustion chambers 2 increases, whereas the total amount of fuel added from the fuel addition devices decreases as the total amount of the exhaust gas emitted from the combustion chambers 2 decreases. Also, the total amount of fuel added from the fuel addition devices decreases as the degree of richness of the air/fuel ratio of the exhaust gas emitted from the combustion chambers 2 increases, whereas the total amount of fuel added from the fuel addition devices increases as the degree of richness of the air/fuel ratio of the exhaust gas emitted from the combustion chambers 2 decreases.

With the control as described above, the filter temperature can be surely controlled to the target temperature even in the case where it is difficult to control the filter temperature to the target temperature while preventing the temperature of the NOx catalyst(s) from reaching the permissible upper limit temperature, simply by controlling the amounts of fuel added from the fuel addition devices.

In the exhaust emission control system of the illustrated embodiment, the filter temperature may be controlled under half-rich/half-lean control by controlling the proportion of the amount of fuel injected from each fuel addition device with respect to the total fuel addition amount. In other words, the proportion of the amount of fuel injected from each fuel addition device with respect to the total fuel addition amount is controlled, depending upon the filter temperature, so that the filter temperature becomes equal to the target temperature.

If the filter temperature does not reach the target temperature during execution of the half-rich/half-lean control, for example, the amount of fuel injected from the rich-side fuel addition device is increased, and the amount of fuel injected from the lean-side fuel addition device is reduced. Namely, the proportion of the amount of fuel injected from the rich-side fuel addition device with respect to the total fuel addition amount is increased, and the proportion of the amount of fuel injected from the lean-side fuel addition device with respect to the total fuel addition amount is reduced. As a result, the amounts of fuel and oxygen supplied to the filter 27 are increased, whereby the temperature of the filter 27 is raised.

If the filter temperature exceeds the target temperature during execution of the half-rich/half-lean control, on the other hand, the amount of fuel injected from the rich-side fuel addition device is reduced, and the amount of fuel injected from the lean-side fuel addition device is increased. Namely, the proportion of the amount of fuel injected from the rich-side fuel addition device with respect to the total fuel addition amount is reduced, and the proportion of the amount of fuel injected from the lean-side fuel addition device with respect to the total fuel addition amount is increased. As a result, the amounts of fuel and oxygen supplied to the filter 27 are reduced, whereby the temperature of the filter 27 is lowered.

The air/fuel ratio of the exhaust gas emitted from the combustion chambers 2 may be shifted to the lean side by, for example, reducing the amount of fuel injected from the fuel injectors 3. Conversely, the air/fuel ratio of the exhaust gas emitted from the combustion chambers 2 may be shifted to the rich side by, for example, increasing the amount of fuel injected from the fuel injectors 3.

The air/fuel ratio of the exhaust gas emitted from the combustion chambers 2 may also be shifted to the lean side by, for example, reducing the opening of the EGR control valve so as to reduce the amount of EGR gas, thereby increasing the amount of air (i.e., new air) newly drawn into the combustion chambers 2. Conversely, the air/fuel ratio of the exhaust gas emitted from the combustion chambers 2 may be shifted to the rich side by, for example, increasing the opening of the EGR control valve so as to increase the amount of EGR gas, thereby reducing the amount of new air.

In the half-rich/half-lean control as described above, the air/fuel ratio of exhaust gas delivered from each NOx catalyst is controlled by controlling both the amounts of fuel injected from the respective fuel addition devices and the openings of the flow control valves. However, the air/fuel ratio of the exhaust gas delivered from each NOx catalyst may be controlled by controlling the amounts of fuel injected from the fuel addition devices while keeping the openings of the flow control valves constant. This control is particularly advantageous in the case where it is easier to control the fuel addition amounts of the fuel addition devices rather than controlling the openings of the flow control valves. Alternatively, the air/fuel ratio of the exhaust gas delivered from each NOx catalyst may be controlled by controlling the openings of the flow control valves while keeping the fuel addition amounts of the fuel addition devices constant. This control is particularly advantageous in the case where it is easier to control the openings of the flow control valves rather than controlling the fuel addition amounts of the fuel addition devices.

Figure 4:
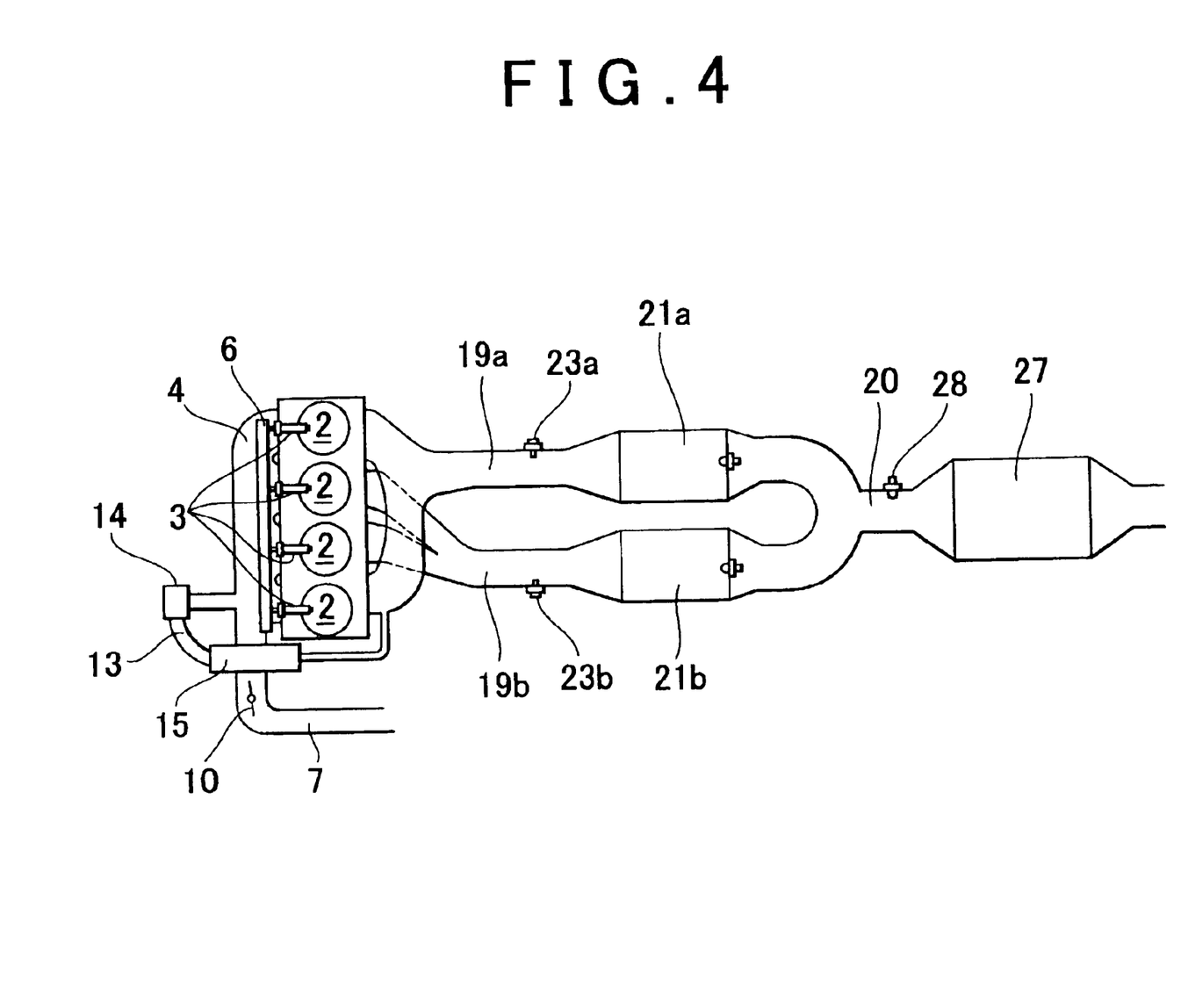
FIG. 4 is a view showing an emission exhaust control system according to another embodiment of the invention.

FIG. 4 illustrates an exhaust emission control system according to another embodiment of the invention, which system has a different structure from the exhaust emission control system of FIG. 1 as described above. In the exhaust emission control system of FIG. 4, the first exhaust branch pipe 19a is connected to two combustion chambers 2 that are located at the longitudinally opposite ends of the engine body 1, and the second exhaust branch pipe 19b is connected to two combustion chambers 2 located in an intermediate portion of the engine body 1. Since the exhaust branch pipes 19a, 19b are respectively connected to different sets of the combustion chambers 2 in the emission control system of FIG. 4, it is possible to supply exhaust gases having different air/fuel ratios to the respective NOx catalysts 21a, 21b, by causing air-fuel mixtures having different air/fuel ratios to be burned in the respective combustion chambers 2.

For example, in the exhaust emission control system of FIG. 4, an air-fuel mixture having a rich air/fuel ratio may be burned in each of the two combustion chambers 2 located at longitudinally opposite ends of the engine body 1, while an air-fuel mixture having a lean air/fuel ratio may be burned in each of the two combustion chambers 2 located in the intermediate portion of the engine body 1. In this case, exhaust gas (rich gas) having a rich air/fuel ratio is supplied to the first NOx catalyst 21a, and exhaust gas (lean gas) having a lean air/fuel ratio is supplied to the second NOx catalyst 21b. As a result, rich gas flows from the first NOx catalyst 21a to which rich gas is supplied, and lean gas flows from the second NOx catalyst 21b to which lean gas is supplied. In this case, rich gas and lean gas flow into the filter 27. Thus, the exhaust emission control system of FIG. 4 is able to perform the half-rich/half-lean control of any of the above-described control examples.

What is claimed is:

1. An exhaust emission control system for purifying exhaust gas emitted from at least one combustion chamber of an internal combustion engine, comprising:
   an exhaust passage that comprises a first exhaust branch passage and a second exhaust branch passage, which join at downstream ends thereof into a common exhaust passage;
   a first NOx catalyst disposed in the first exhaust branch passage;
   a second NOx catalyst disposed in the second exhaust branch passage;
   a particulate filter disposed in the common exhaust passage and located downstream of a joining point of the first exhaust branch passage and the second exhaust branch passage;
   a first flow control valve that controls an amount of exhaust gas flowing through the first exhaust branch passage; and
   a second flow control valve that controls an amount of exhaust gas flowing through the second exhaust branch passage, wherein
   each of the first and second NOx catalysts stores NOx contained in the exhaust gas when an air/fuel ratio of the exhaust gas flowing into said each NOx catalyst is lean, and allows a reducing agent to reduce and remove the stored NOx when the air/fuel ratio of the exhaust gas flowing into said each NOx catalyst is rich; and
   the particulate filter traps particulates contained in the exhaust gas, and oxidizes and removes the trapped particulates.

2. The exhaust emission control system according to claim 1, further comprising a controller that causes exhaust gas having a rich air/fuel ratio to flow from one of the first and second exhaust branch passages, and causes exhaust gas having a lean air/fuel ratio to flow from the other of the first and second exhaust branch passages, when a temperature of the particulate filter is required to be raised.

3. The exhaust emission control system according to claim 2, wherein when the temperature of the particulate filter is required to be raised, the controller causes exhaust gas having a rich air/fuel ratio to flow into the NOx catalyst disposed in the one of the first and second exhaust branch passages so that the exhaust gas having the rich air/fuel ratio flows from the one of the exhaust branch passages.

4. The exhaust emission control system according to claim 2, wherein the controller controls an average air/fuel ratio of exhaust gas flowing into the particulate filter to be lean so as to promote a function of the particulate filter to oxidize the particulates.

5. The exhaust emission control system according to claim 2, wherein the controller controls an average air/fuel ratio of exhaust gas flowing into the particulate filter to be lean so that the temperature of the particulate filter is raised to a level at which the particulates are oxidized and removed at a time.

6. The exhaust emission control system according to claim 2, wherein the controller controls an average air/fuel ratio of exhaust gas flowing into the particulate filter to be lean so that the temperature of the particulate filter is raised to a level at which the particulates burn out.

7. The exhaust emission control system according to claim 2, wherein:
   the particulate filter has a NOx storage function; and
   when it is required to release SOx from the particulate filter, the controller raises the temperature of the particulate filter to a level at which SOx is released from the particulate filter, and controls an average air/fuel ratio of exhaust gas flowing into the particulate filter to be rich or stoichiometric.

8. The exhaust emission control system according to claim 2, wherein the controller raises a temperature of one of the first and second NOx catalysts to which the exhaust gas having the rich air/fuel ratio is supplied, to a level at which SOx is released from the one of the NOx catalysts.

9. The exhaust emission control system according to claim 2, wherein:
   the particulate filter has an oxidizing function, and the controller controls an average air/fuel ratio of exhaust gas flowing into the particulate filter to be lean; and
   the controller raises a temperature of one of the first and second NOx catalysts to which the exhaust gas having the rich air/fuel ratio is supplied, to a level at which SOx is released from the one of the NOx catalysts, and keeps the temperature of the particulate filter equal to or lower than a level at which sulfate is formed.

10. The exhaust emission control system according to claim 2, wherein:
   the particulate filter has an oxidizing function; and
   the controller raises a temperature of one of the first and second NOx catalysts to which the exhaust gas having the rich air/fuel ratio is supplied, to a level at which SOx is released from the one of the NOx catalysts, and controls an average air/fuel ratio of exhaust gas flowing into the particulate filter to be lean or slightly lean.

11. The exhaust emission control system according to claim 1, further comprising:
- a first fuel addition device disposed in the first exhaust branch passage and located upstream of the first NOx catalyst;
- a second fuel addition device disposed in the second exhaust branch passage and located upstream of the second NOx catalyst; and
- a controller that controls amounts of fuel injected from the first and second fuel addition devices, respectively.

12. The exhaust emission control system according to claim 11, wherein:
- the particulate filter has an oxidizing function; and
- when it is required to release SOx from both of the first and second NOx catalysts, the controller controls at least one of the amounts of fuel injected from the first and second fuel addition devices and openings of the first and second flow control valves so that temperatures of the first and second NOx catalysts are raised to a level at which SOx is released from the NOx catalysts, rich gas is supplied to the first and second NOx catalysts, and an average air/fuel ratio of exhaust gas flowing into the particulate filter is controlled to be rich or stoichiometric.

13. The exhaust emission control system according to claim 10, wherein:
- the particulate filter has a NOx storage function; and
- when it is required to release SOx from the first and second NOx catalysts and release SOx from the particulate filter, the controller controls at least one of the amounts of fuel injected from the first and second fuel addition devices and openings of the first and second flow control valves so that temperatures of the first and second NOx catalysts are raised to a level at which SOx is released from the NOx catalysts, rich gas is supplied to the first and second NOx catalysts, a temperature of the particulate filter is raised to a level at which SOx is released from the particulate filter, and an average air/fuel ratio of exhaust gas flowing into the particulate filter is controlled to be rich or stoichiometric.

14. The exhaust emission control system according to claim 2, wherein:
- the particulate filter has a NOx storage function; and
- when it is required to release SOx from one of the first and second NOx catalysts and release SOx from the particulate filter, the controller raises a temperature of the one of the NOx catalysts to a level at which SOx is released from the NOx catalyst, raises the temperature of the particulate filter to a level at which SOx is released from the particulate filter, and controls an average air/fuel ratio of exhaust gas flowing into the particulate filter to be rich or stoichiometric.

15. The exhaust emission control system according to claim 14, wherein the controller raises the temperature of the particulate filter to the level at which SOx is released from the particulate filter before raising the temperature of the one of the NOx catalysts to the level at which SOx is released from the NOx catalyst.

16. The exhaust emission control system according to claim 11, wherein the controller causes fuel to be injected from the first and second fuel addition devices before executing control of supplying rich gas to one of the first and second NOx catalysts and supplying lean gas to the other of the NOx catalysts so that an average air/fuel ratio of exhaust gas flowing into the particulate filter is controlled to be lean or stoichiometric.

17. The exhaust emission control system according to claim 1, further comprising a controller that supplies rich gas to at least one of the first and second NOx catalysts so that a temperature of the at least one NOx catalyst is raised to a level at which SOx is released, and then performs control of supplying rich gas to one of the first and second NOx catalysts and supplying lean gas to the other NOx catalyst after an amount of SOx released from the at least one NOx catalyst reaches a peak, so that a temperature of the particulate filter is raised to a level at which SOx is released from the particulate filter, and an average air/fuel ratio of exhaust gas flowing into the particulate filter is controlled to be rich or stoichiometric.

18. The exhaust emission control system according to claim 2, wherein when it is required to reduce and remove NOx from one of the first and second NOx catalyst to which the exhaust gas having the lean air/fuel ratio is supplied, the controller periodically supplies rich gas to the NOx catalyst.

19. The exhaust emission control system according to claim 2, wherein when a temperature of one of the first and second NOx catalysts to which the exhaust gas having the rich air/fuel ratio is supplied exceeds a permissible upper limit thereof, the controller reduces an opening of one of the first and second flow control valves corresponding to the one of the NOx catalysts, or increases an opening of the other of the flow control valves corresponding to the other NOx catalyst.

20. The exhaust emission control system according to claim 2, wherein the controller causes the exhaust gas having the rich air/fuel ratio and the exhaust gas having the lean air/fuel ratio to alternately flow from each of the first and second exhaust branch passages.

21. The exhaust emission control system according to claim 20, wherein the controller causes the exhaust gas having the rich air/fuel ratio and the exhaust gas having the lean air/fuel ratio to alternately flow from each of the first and second exhaust branch passages at predetermined time intervals.

22. The exhaust emission control system according to claim 20, wherein:
- the controller causes exhaust gas having a rich air/fuel ratio to flow into the NOx catalyst disposed in the one of the first and second exhaust branch passages so that the exhaust gas having the rich air/fuel ratio flows from the one of the exhaust branch passages, and causes exhaust gas having a lean air/fuel ratio to flow into the NOx catalyst disposed in the other of the first and second exhaust branch passages so that the exhaust gas having the lean air/fuel ratio flows from the other exhaust branch passage; and
- the controller causes the exhaust gas having the rich air/fuel ratio and the exhaust gas having the lean air/fuel ratio to alternately flow from each of the first and second exhaust branch passages so that a temperature of each of the first and second NOx catalysts is kept equal to or lower than a predetermined temperature.

23. The exhaust emission control system according to claim 1, further comprising a controller that supplies rich gas to the first and second NOx catalysts so that a temperature of the particulate filter is raised to a fuel oxidation temperature, before executing control of supplying rich gas to one of the first and second NOx catalysts and supplying lean gas to the other NOx catalyst.

24. The exhaust emission control system according to claim 1, wherein the particulate filter has an oxidizing function, the exhaust emission control system further comprising a controller that:

periodically supplies rich gas to the particulate filter before executing control of supplying rich gas to one of the first and second NOx catalysts and supplying lean gas to the other NOx catalyst for controlling an air/fuel ratio of exhaust gas flowing into the particulate filter to be lean.

25. The exhaust emission control system according to claim 1, wherein the particulate filter has an oxidizing function, the emission exhaust control system further comprising a controller that:

when it is required to reduce and remove NOx at at least one of the NOx catalysts, periodically supplies rich gas to the at least one NOx catalyst, and controls an average air/fuel ratio of exhaust gas flowing into the particulate filter to be lean.

26. The exhaust emission control system according to claim 2, wherein the controller controls a proportion of an amount of the exhaust gas having the rich air/fuel ratio which flows from the one of the first and second exhaust branch passages to an amount of the exhaust gas having the lean air/fuel ratio which flows from the other exhaust branch passage so that the temperature of the particulate filter is kept equal to or lower than a predetermined temperature.

27. The exhaust emission control system according to claim 2, further comprising:

at least one fuel addition device mounted in at least one of the first and second exhaust branch passages and located upstream of at least one of the first and second NOx catalysts, wherein the controller controls an air/fuel ratio of exhaust gas flowing from each of the first and second NOx catalysts by controlling at least one of an air/fuel ratio of exhaust gas emitted from the at least one combustion chamber, an amount of fuel injected from each of the at least one fuel addition device, and an opening of each of the first and second flow control valves, so as to control the temperature of the particulate filter.

28. The exhaust emission control system according to claim 1, wherein:

said at least one combustion chamber comprises two or more combustion chambers;

at least one of the combustion chambers is connected to the first exhaust branch passage, and a remaining one or more of the combustion chambers is connected to the second exhaust branch passage; and an air/fuel ratio of exhaust gas that flows into the first exhaust branch passage and an air/fuel ratio of exhaust gas that flows into the second exhaust branch passage are controlled independently of each other.

* * * * *